US008048176B2

(12) United States Patent
Lee et al.

(10) Patent No.: US 8,048,176 B2
(45) Date of Patent: Nov. 1, 2011

(54) REFORMER OF FUEL CELL SYSTEM AND METHOD OF CONTROLLING THE SAME

(75) Inventors: Dong-woo Lee, Yongin-si (KR); Tae-sang Park, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1042 days.

(21) Appl. No.: 11/766,385

(22) Filed: Jun. 21, 2007

(65) Prior Publication Data
US 2008/0096062 A1    Apr. 24, 2008

(30) Foreign Application Priority Data

Oct. 24, 2006  (KR) .................. 10-2006-0103613

(51) Int. Cl.
  B01J 7/00     (2006.01)
  B01J 19/00    (2006.01)
  H01M 8/06     (2006.01)
  C01B 3/36     (2006.01)
  C10J 3/46     (2006.01)
  F28D 21/00    (2006.01)
(52) U.S. Cl. ........... 48/61; 48/197 R; 422/198; 422/202; 422/203; 422/204
(58) Field of Classification Search .......... 48/61, 197 R; 422/198, 202–205
See application file for complete search history.

(56) References Cited

U.S. PATENT DOCUMENTS

| 2,598,879 | A | * | 6/1952 | Barnes ......................... 122/333 |
| 2,675,868 | A | * | 4/1954 | Ray et al. ...................... 431/352 |
| 6,632,084 | B2 | * | 10/2003 | Berenbrink .................. 431/284 |
| 2003/0035983 | A1 | * | 2/2003 | Ukai et al. ..................... 429/17 |
| 2006/0112637 | A1 | * | 6/2006 | An et al. ............................ 48/61 |

FOREIGN PATENT DOCUMENTS

JP           09170722 A   *   6/1997

OTHER PUBLICATIONS

Machine Translation of JP09-170722A (Nov. 11, 2010).*

* cited by examiner

*Primary Examiner* — Matthew Merkling
(74) *Attorney, Agent, or Firm* — Lee & Morse, P.C.

(57) ABSTRACT

A reformer for a fuel cell system, and a method of controlling the reformer. The reformer includes a cylindrical reforming catalyst; a burner disposed inside of the reforming catalyst and comprising a plurality of nozzles to direct flames at the reforming catalyst; a nozzle covering element to selectively cover a portion of each of the nozzles; a combustion fuel supply valve to change the amount of a combustion fuel that is supplied to the burner; and a controller that controls the nozzle covering units and the combustion supply valve. The method of controlling the reformer includes: moving the nozzle covering element to cover a decreasing portion of each of the nozzles in response to an increasing amount of the combustion fuel being supplied to the burner; and moving the nozzle covering element to cover a increasing portion of each of the nozzles in response to a decreasing amount of the combustion fuel supplied to the burner.

9 Claims, 7 Drawing Sheets

REFORMER OF FUEL CELL SYSTEM AND METHOD OF CONTROLLING THE SAME

CROSS-REFERENCE TO RELATED APPLICATIONS

This application claims the benefit of Korean Application No. 2006-103613, filed on Oct. 24, 2006, in the Korean Intellectual Property Office, the disclosure of which is incorporated herein by reference.

BACKGROUND OF THE INVENTION

1. Field of the Invention

Aspects of the present invention relate to a fuel processor of a fuel cell system, and more particularly, to a reformer included in a fuel processor, and a method of controlling the same.

2. Description of the Related Art

A fuel cell is a generator of electricity that changes the chemical energy of a fuel into electrical energy, through a chemical reaction. A fuel cell can continuously generate electricity as long as the fuel is supplied. Fuel cell systems can be broadly divided into fuel cell systems that use liquid hydrogen, and fuel cell systems that use hydrogen gas. The fuel cell systems that use hydrogen gas include fuel cell stacks and fuel processors. The fuel cell stacks have a structure in which a few to a few tens of unit cells, each including a membrane electrode assembly (MEA), and a separator, are stacked.

FIG. 1 is a schematic diagram showing a configuration of a conventional fuel cell system.

Referring to FIG. 1, a fuel, that includes hydrogen atoms, is reformed into hydrogen gas in a fuel processor, and the hydrogen gas is supplied to a fuel cell stack. In the fuel cell stack, the hydrogen gas is electrochemically reacted with oxygen to generate electrical energy.

The fuel processor includes a desulfurizer and a hydrogen generation apparatus. The hydrogen generation apparatus includes a reformer and a shift reactor. The desulfurizer removes sulfur from the fuel so that catalysts, in the reformer and the shift reactor, are not poisoned by sulfur compounds.

Hydrogen gas is generated from the hydrocarbons in the reformer, but in addition to the hydrogen gas, carbon dioxide ($CO_2$) and carbon monoxide (CO), are also produced. However, CO acts as a poison to the catalysts used on electrodes of the fuel cell stack. Therefore, the hydrogen gas generated in the reformer is not directly supplied to the fuel cell stack, but rather is supplied after the CO is removed by the shift reactor. Conventionally, the hydrogen gas that has passed through the shift reactor has a CO content of 10 ppm or less.

FIG. 2 is a cross-sectional view illustrating a conventional reformer. FIG. 3 is a graph showing the temperature distribution in the reformer of FIG. 2, at different locations of a reforming catalyst. In FIG. 3, the temperature distributions in the reformer are compared at different positions, in a combustion chamber thereof, when loads of 100% and 25% are applied to a burner.

Referring to FIG. 2, a conventional reformer 10 includes a burner 15 that can eject one large flame 25 into a combustion chamber 11, which is disposed inside a pipe-shaped reforming catalyst 20. When a combustion fuel, composed of methane $CH_4$ and air, is ignited by ejecting the combustion fuel into the combustion chamber 11, via the burner 15, the combustion fuel is combusted, and a flame 25 is generated, heating the reforming catalyst 20. Thus, a hydrogen generation reaction occurs in the reforming catalyst 20.

A fuel cell system may operate at 100% of a designed power production capacity (load), or may operate at less than 100% of the designed capacity, according to power consumption of electrical equipment electrically connected to the fuel cell system. When the fuel cell system is operated with a load that is less than 100% of the designed capacity, the burner 15 of the reformer 10 is also operated at a reduced load. More specifically, the loads to the burner 15, and the reformer 10, are proportional to the load to the fuel cell system 100 as a whole.

Referring to FIG. 3, different portions H, of the reforming catalyst 20, in the reformer 10 of FIG. 2, have different temperatures. More specifically, a central portion B, of the reforming catalyst 20, which is closer to the flame 25, has a relatively high temperature, and a lower and upper portions A and C of the reforming catalyst 20, which are relatively farther from the flame 25, have relatively lower temperatures. Also, the size of the flame 25 is larger when a load to the burner 15 is 100%, than when the load to the burner 15 is 25%. Thus, the overall temperature of the reforming catalyst 20, when a load to the burner 15 is 100%, is higher than when the load to the burner 15 is 25%.

The hydrogen generation reaction, on the reforming catalyst 20, is an endothermic reaction, and the hydrogen generation reaction is conducted at a temperature of approximately 700° C., or more. In the reformer 10, there are large temperature differences, according to the height of the reforming catalyst 20. The temperature of the central portion B can be maintained at 700° C., or more, regardless of the load to the burner 15, but it is difficult to maintain the temperatures of the lower and upper portions A and C at 700° C., or more. In particular, it is particularly difficult to maintain the temperature of 700° C. at the lower and upper portions A and C, when the load to the burner 15 is small. Accordingly, there is a problem that, although the reforming catalysts at the lower and upper portions A and C, of the reforming catalyst 20, are not completely consumed, all of the reforming catalyst 20 must be replaced, due to the exhaustion of the reforming catalysts in the central portion B.

SUMMARY OF THE INVENTION

Aspects of the present invention provide a reformer in which all portions of a reforming catalyst can be heated to a uniform temperature.

Aspects of the present invention also provide a reformer in which a flame can be ejected to all portions of a reforming catalyst, regardless of the load on a corresponding burner.

According to an aspect of the present invention, there is provided a reformer comprising: a reforming catalyst having a cylindrical shape; a burner comprising nozzles, which is disposed in the reformer inside of the reforming catalyst; a nozzle covering element to control the flow of a combustion fuel through the nozzles; a combustion fuel supply element that changes the amount of combustion fuel supplied to the burner; and a controller that controls the nozzle covering element, to change the degree of opening of the nozzles in connection with the amount of the combustion fuel supplied to the burner. The nozzles are disposed on an outer surface of the burner and face the reforming catalyst, and are to make flames by directing the ejection of the ignited combustion fuel towards the reforming catalyst.

The nozzle covering element may comprise a cam comprising: a central part that extends in a lengthwise direction along the length of burner, and can be rotated inside of the burner; and a plurality of covering units, attached to the central part, that each correspond to a single nozzle, and change the size of the respective openings to the nozzles, according to a rotation angle of the central part. The nozzles may have oval-shaped openings.

An inner surface of the reforming catalyst may face the plurality of nozzles. The controller may control the position of the covering units, so that flames, formed by ejecting the combustion fuel from the nozzles, reach the reforming catalyst, regardless of variations in the supply of the combustion fuel to the burner, so long as a minimum amount of combustion fuel is supplied to the burner.

The controller may control the position of the covering units so that the hottest portions of the flames, formed by ejecting the combustion fuel from the nozzles, reach the reforming catalyst.

The controller may control the position of the covering units so that the portion of each nozzle that is covered is decreased, when the amount of the combustion fuel supplied to the burner is increased, and the portion of each nozzle that is covered is increased, when the amount of the combustion fuel supplied to the burner is decreased.

According to an aspect of the present invention, there is provided a method of controlling a reformer that comprises a reforming catalyst having a cylindrical shape, and a burner which is disposed on the inside of the reforming catalyst, and comprises a plurality of nozzles on an outer surface thereof, facing the reforming catalyst. The method comprising: covering a smaller portion of each of the nozzles, when the amount of the combustion fuel supplied to the burner is increased; and covering a larger portion of each of the nozzles, when the amount of the combustion fuel supplied to the burner is reduced.

The portion of each of the nozzles that is covered may be controlled so that flames, formed by ejecting the combustion fuel from the nozzles, reach the reforming catalyst, regardless of the amount of the combustion fuel supplied to the burner, so long that a minimum amount of combustion fuel is supplied to the burner.

The degree of covering of the nozzles may be controlled so that the hottest portions of the flames, formed by ejecting the combustion fuel from the nozzles, reach the reforming catalyst.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
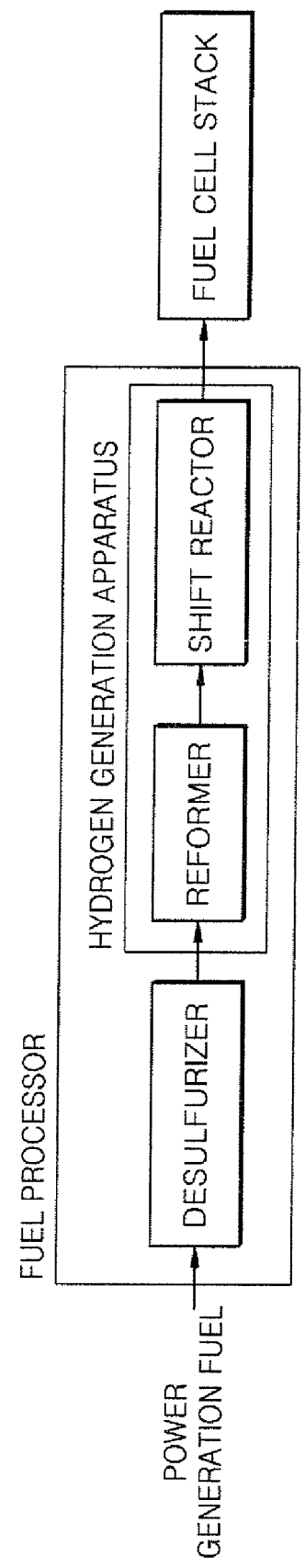
FIG. 1 is a schematic diagram showing a configuration of a conventional fuel cell system.
Figure 2:
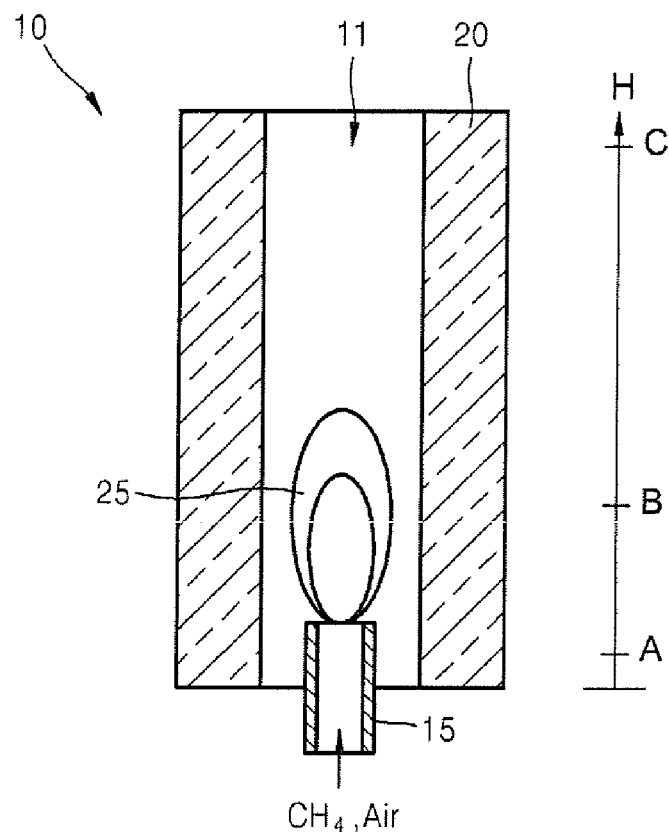
FIG. 2 is a cross-sectional view illustrating a conventional reformer.
Figure 3:
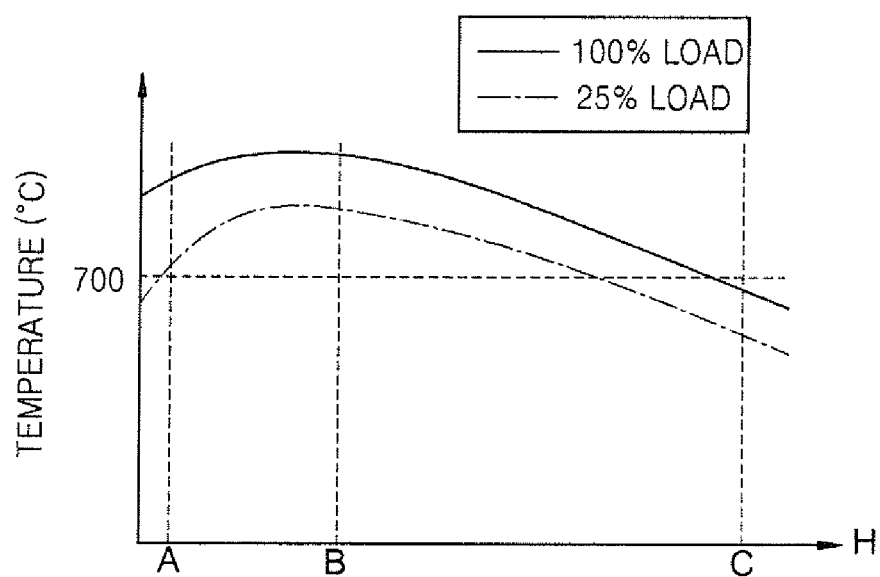
FIG. 3 is a graph showing the comparison of temperature distribution in the reformer of FIG. 2, according to height of a reforming catalyst, when loads of 100% and 25% are applied to a burner.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4:
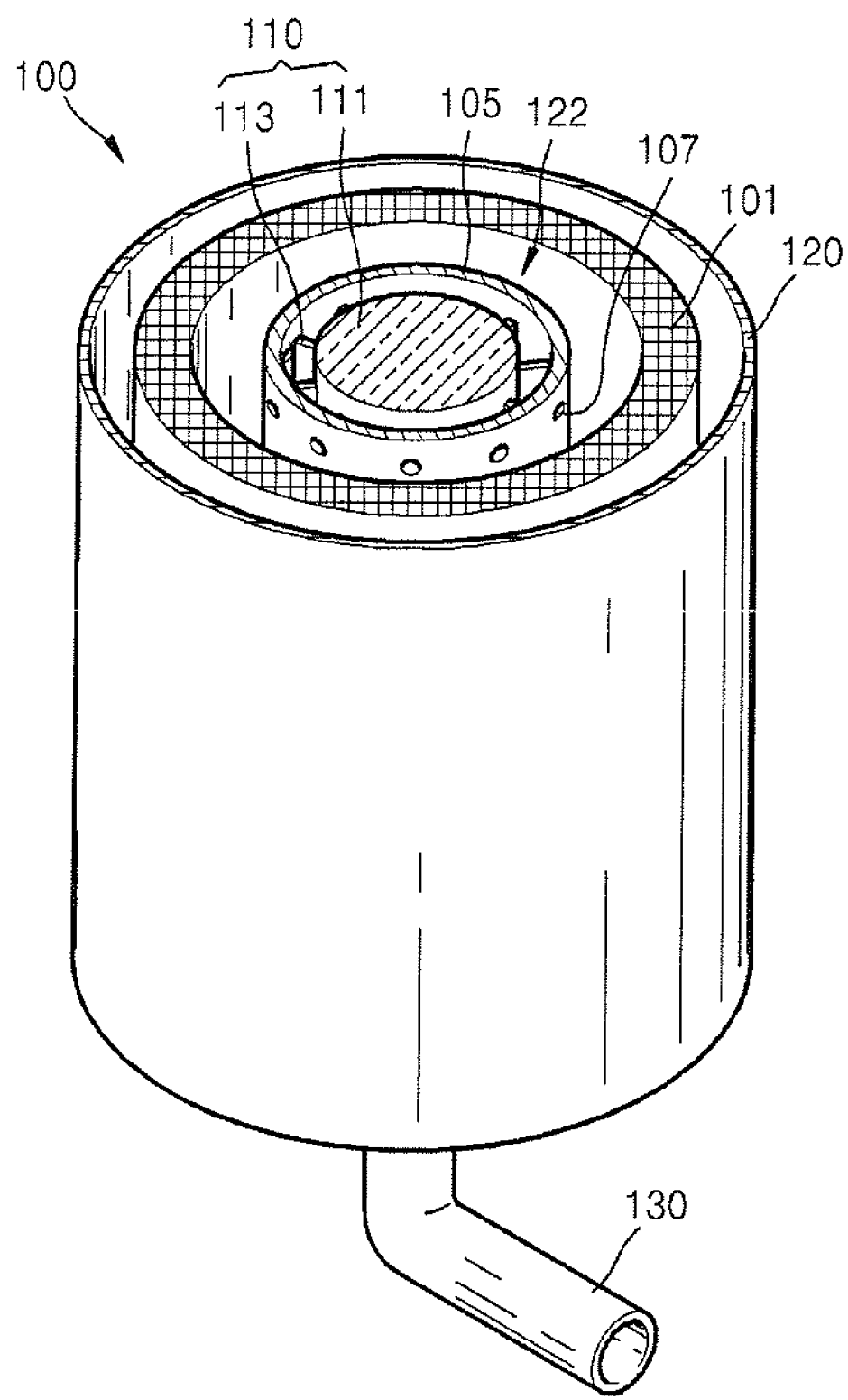
FIG. 4 is a partial cutaway perspective view of a reformer, according to an embodiment of the present invention.
Figure 5:
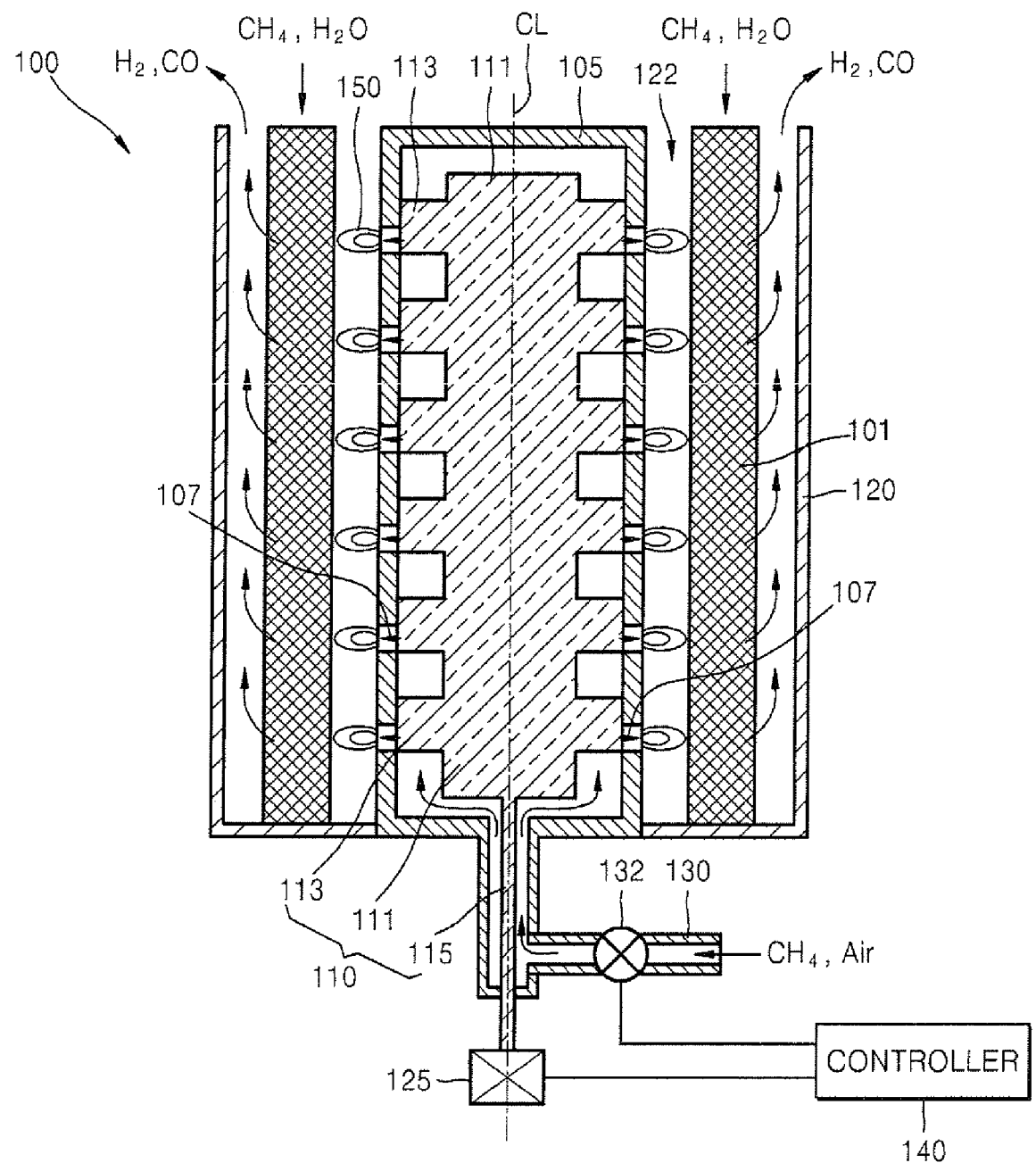
FIG. 5 is a vertical cross-sectional view of the reformer of FIG. 4.

FIG. 4 is a partial cutaway perspective view of a reformer 100 according to an embodiment of the present invention. FIG. 5 is a vertical cross-sectional view of the reformer 100 of FIG. 4.

Referring to FIGS. 4 and 5, the reformer 100 includes a cylindrically shaped reforming catalyst 101 and a cylindrically shaped burner 105. The reforming catalyst 101 is disposed inside the reformer 100, and the burner 105 is disposed inside of the reforming catalyst 101. The reformer has a first end shown at the top of FIG. 5, and a second end shown at the bottom of FIG. 5.

Figure 8:
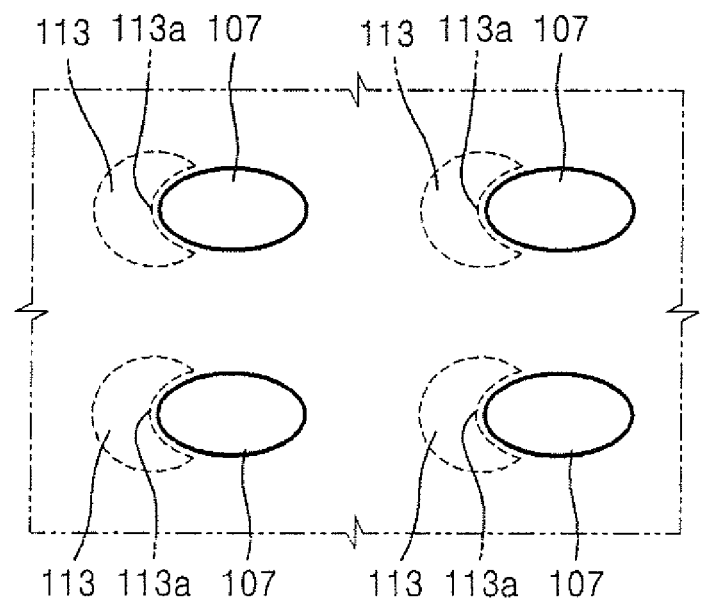
FIGS. 8 and 9 are views of outer surfaces of the burner showing the openings of nozzles, and the relative position of covering units depicted by virtual (dashed) lines, FIG. 8 showing when a load of 100% is applied to the reformer, and FIG. 9 showing when a load of 50% is applied to the reformer.
Figure 9:
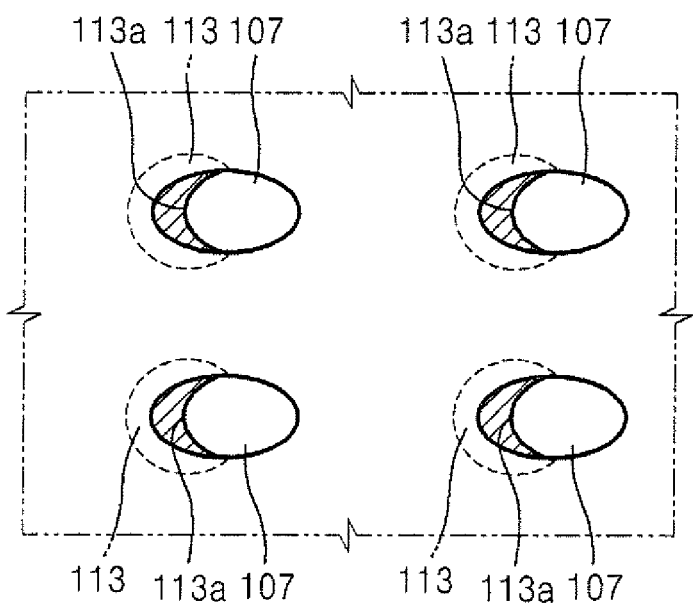

A plurality of nozzles 107 are disposed on the outer surface of the burner 105. The nozzles 107 are to make flames 150 by directing a combustion fuel towards the reforming catalyst 101. The nozzles 107 are uniformly distributed on the outer surface of the burner 105, so that the entire inner surface of the reforming catalyst 101 can face the plurality of nozzles 107. Accordingly, the flames 150 can be uniformly formed to point towards the entire inner surface of the reforming catalyst 101. As depicted in FIGS. 8 and 9, each nozzle 107 has an oval shaped opening.

The reformer 100 includes a cam 110, and a motor 125 to drive the cam 110. The cam 110 is a nozzle covering element that can control the degree of opening of the nozzles 107. The cam 110 is installed inside of the burner 105, and includes: a central part 111, extending in a lengthwise direction, with respect to the length of the burner 105; a plurality of covering units 113 which extend in a radial direction towards the inner surface of the burner 105, with each covering unit 113 corresponding to a single nozzle 107; and a shaft 115 that is connected to a second end of the central part 111, and extends out of the burner 105. The shaft 115 transmits a rotational force from the motor 125, to the central part 111, to rotate the cam 110.

Figure 6:
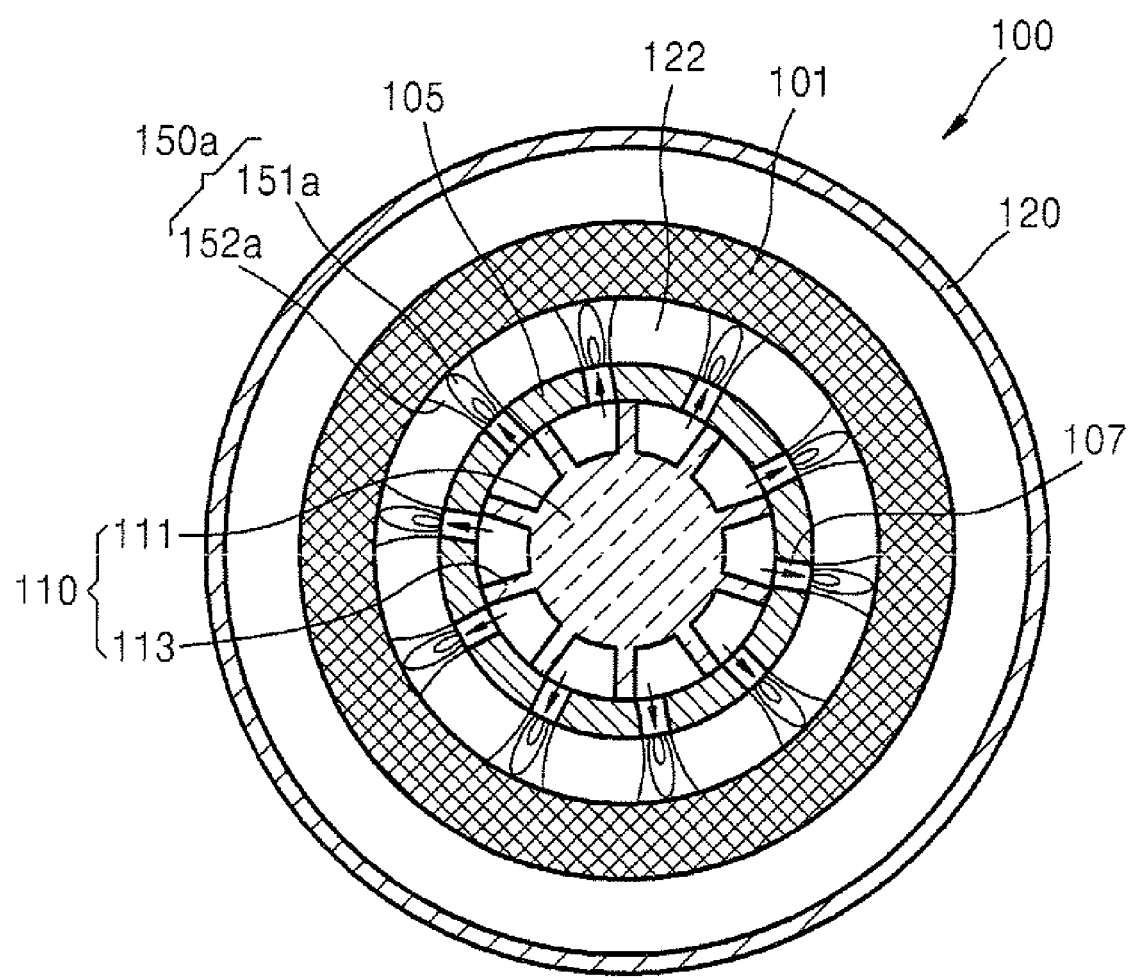
FIGS. 6 and 7 respectively are horizontal cross-sectional views of the reformer of FIG. 4, when loads of 100% and 50% are applied to the reformer.
Figure 7:
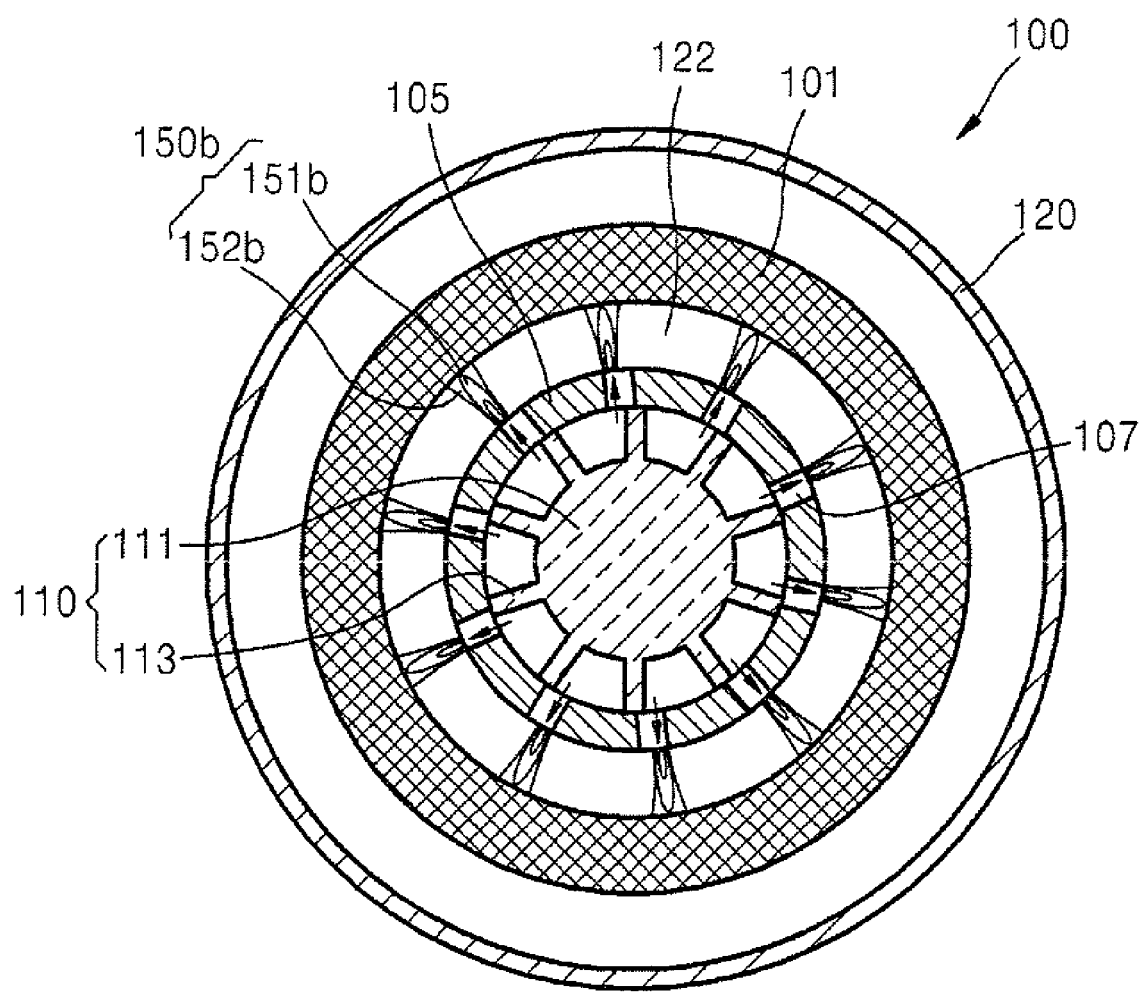

The central part 111 can rotate around a central axis CL, of the central part 111, which extends along the length of the burner 105. The rotation can be driven by the motor 125. The covering units 113 can control the degree of covering of the nozzles 107, according to the amount of rotation of the central part 111. That is, the covering units 113 can be positioned to not cover any part of the openings of the nozzles 107, to leave the nozzles 107 entirely open as depicted in FIGS. 6 and 8, or can be positioned to cover a portion of the openings of the nozzles 107, as depicted in FIGS. 7 and 9. In FIG. 9, shaded regions indicate the regions of the openings of the nozzles 107 that are covered by the covering units 113. The covering unit 113 is formed so that an end of the covering unit 113, that contacts the inner surface of the burner 105, has a concave portion 113a. The concave portion 113a has a shape corresponding to a side of the oval opening of the nozzle 107. Accordingly, as depicted in FIG. 9, when the openings of the nozzles 107 are partly covered, the uncovered portion of the openings forms a circle, or an oval with a smooth surface, thereby smoothly directing the fuel to make flames 150. The phrases "covering the nozzles", and "covering the openings of the nozzles", and variations thereof, are used interchangeably herein, and refer to the same activity.

The reformer 100 includes a combustion fuel supply tube 130 connected to the second end of the burner 105, and a combustion fuel supply valve 132 located in the combustion fuel supply tube 130, to control the supply of a combustion fuel composed of methane $CH_4$ and air, to the burner 105. The combustion fuel supply valve 132 controls the amount of fuel supplied to the inside of the burner 105, by controlling the amount to which the combustion fuel supply tube 130 is opened.

The reformer 100 further includes a controller 140 that controls the motor 125 so that the covered portion of the nozzles 107 can be changed in connection with the amount of the combustion fuel supplied to the inside of the burner 105. The controller 140 is connected to the combustion fuel supply valve 132, and the motor 125. The controller 140 is to control the rotation of the cam 110, to change the amount of covering of the nozzles 107, by controlling the rotation of the motor 125, through a motor driving signal. Also, the controller 140 controls the fuel supply valve 132, to control the amount of combustion fuel that is supplied to the burner 105, by sending a valve driving signal to the combustion fuel supply valve 132.

A hydrogen guide 120 to convey hydrogen $H_2$, obtained from a power generation fuel, out of the first end of the reformer 100, is formed outside of the reforming catalyst 101. An exhaust gas path 122 provides a fluid communication between the burner 105 and the reforming catalyst 101.

When the nozzles 107 are completely uncovered, a combustion fuel is supplied to the inside of the burner 105, via the combustion fuel supply valve 132. The combustion fuel is directed towards the reforming catalyst 101 by the nozzles 107. At this point, the combustion fuel is ignited, and the flames 150 heat the reforming catalyst 101. When the entire reforming catalyst 101 is heated to a temperature of 700° C., or more, a power generation fuel, that contains methane gas $CH_4$ and steam $H_2O$, is supplied to the reforming catalyst 101. Hydrogen $H_2$, a small amount of carbon monoxide CO, and other gases are produced by a reforming reaction in the reforming catalyst 101. The produced gas, that contains hydrogen $H_2$, is discharged out of the first end of the reformer 100, and can be supplied to a shift reactor (refer to FIG. 1) via the hydrogen guide 120. Exhaust gas produced from the combustion is discharged from the reformer 100 via the exhaust gas path 122.

A method of controlling the reformer 100 will now be described with reference to FIGS. 5 through 9.

FIGS. 6 and 7 are horizontal cross-sectional views of the reformer 100 of FIG. 4. FIG. 6 shows when a load of 100% is applied to the reformer 100, and FIG. 7 shows when a load of 50% is applied to the reformer 100. FIGS. 8 and 9 are views of the outer surfaces of a portion of the burner 105, and show the openings of the nozzles, and the relative position of the covering units 113 depicted by virtual (dashed) lines. FIG. 8 shows when a load of 100% is applied to the reformer 100, and FIG. 9 shows when a load of 50% is applied to the reformer 100.

Referring to FIGS. 5, 6, and 8, in order to operate the burner 105 at a 100% load, the controller 140 applies an appropriate valve driving signal to the combustion fuel supply valve 132, so that the combustion fuel supply valve 132 opens completely. Also, the controller 140 applies an appropriate motor driving signal to the motor 125, so that the openings of the nozzles 107 are completely uncovered. As depicted in FIGS. 6 and 8, a large amount of combustion fuel is rapidly ejected through the completely uncovered nozzles 107. When the combustion fuel ejected from the nozzles 107 is ignited, large flames 150a reach the reforming catalyst 101. The flames 150a heat the reforming catalyst 101 while touching the reforming catalyst 101, thereby increasing heating efficiency. Also, as described above, the plurality of nozzles 107 can be used to evenly heat the entire reforming catalyst 101. The entire reforming catalyst 101 can be uniformly utilized, preventing the waste inherent with the localized utilization of the reforming catalyst 101.

The flame 150a can be divided into an external (oxidizing) flame 152a, and an inner (reducing) flame 151a. The tip of the inner flame 151a maintains higher temperature than the external flame 152a. In the present embodiment, a combustion fuel supply pressure and a distance between the nozzle 107, and the reforming catalyst 101, are determined so that the tip of the inner flame 151a can reach the reforming catalyst 101. Therefore, the heating efficiency of the reforming catalyst 101 is higher than when only the external flame 152a reaches the reforming catalyst 101.

Referring to FIGS. 5, 7, and 9, in order to operate the burner 105 with a 50% load, the controller 140 partly closes the combustion fuel supply tube 130, using the combustion fuel supply valve 132. As a result, the supply of the combustion fuel to the inside of the burner 105 is reduced, as compared to the 100% load. Also, the controller 140 triggers the rotation the cam 110, so that the openings of the nozzles 107 are partly covered by the covering units 113. At this point, the amount of the combustion fuel supplied to the inner space of the burner 105 is reduced, as compared to the 100% load. However, the flow speed of the combustion fuel ejected from the nozzles 107 is not reduced, since the openings of the nozzles 107 are partially covered. When the combustion fuel ejected in this way is ignited, small flames 150b, that are smaller than the large flames 150a (see FIG. 6), made when 100% load is applied to the burner, reach the reforming catalyst 101. The small flames 150b have an inner flame 151b and an outer flame 152b. The controller 140 may control the flow rate of the combustion fuel to the burner 105, and the degree of covering of the nozzles 107, so that the tips of the inner flames 151b can reach the reforming catalyst 101, in addition to the outer flames 152b.

The method of controlling the reformer 100 has been described by comparing cases when the loads to the burner 105 are 100% and 50%. When a load to the burner 105 is 75% and 25%, the reformer 100 can also be operated so that the flames 150 can reach the reforming catalyst 101, and thereby directly heat the reforming catalyst 101. The controller 140 can appropriately control the flow rate of the combustion fuel to the burner 105, and the degree of covering of the nozzles 107. For example, in order to switch the burner 105 from operating at the 50% load from the 100% load, the supply of the combustion fuel to the burner 105 is reduced, and the openings of the nozzles 107 are partly covered, as depicted in FIG. 9. Also, in order to switch the burner 105 to operating at a 75%, load from operating at the 50% load, the supply of the combustion fuel to the burner 105 is increased, and the openings of the nozzles are partially uncovered. The supply of fuel for operating at a 75% load is larger than the supply for operating at the 50% load, and the openings of the nozzles 107 are less covered. For example, the openings at the 75% load are less covered that the openings as depicted in FIG. 9 and move covered than the openings depicted in FIG. 8.

In a reformer according to aspects of the present invention, flames formed by ejecting a combustion fuel from nozzles directly heat a reforming catalyst. The size of the openings to the nozzles can be adjusted, to compensate for variations in the amount of fuel supplied to the nozzles, such that the flames always reach the reforming catalyst. The openings to the nozzles are adjusted by covering a portion of the nozzles. When the fuel supply to the nozzles is decreased, a larger portion of each of the nozzles is covered. When the supply of fuel to the nozzles in increased, a smaller portion of each of the nozzles is covered. Accordingly, the heating efficiency of the reforming catalyst can be increased, and an early replacement of the reforming catalyst, due to a localized consumption of the reforming catalyst, can thereby be prevented. This results in a more effective use of all of the reforming catalyst.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A reformer comprising:
   a reforming catalyst arranged in a cylindrical shape with a hollow interior;
   a burner disposed inside of the reforming catalyst, the burner having an outer surface defining a space between the reforming catalyst and the outer surface of the burner, the burner including a plurality of nozzles configured to direct flow into the space, the nozzles being disposed on the outer surface of the burner to direct flames into the space between the outer surface of the burner and the reforming catalyst and at the reforming catalyst;
   a combustion fuel supply valve to control a supply of a combustion fuel to the burner;
   a nozzle covering element variably covering portions of the nozzles and controlling a flow of the combustion fuel at each nozzle, the nozzle covering element being disposed inside the burner; and
   a controller to control the combustion fuel supply valve and the nozzle covering element,
   wherein the nozzle covering element includes a cam, the cam including:
      a central part to be rotated,
      a plurality of covering units disposed on the central part such that each covering unit is disposed adjacent to one of the nozzles, and
      a shaft that transmits a rotational force and that is connected to one end of the central part, wherein:
         each covering unit variably covers portions of the adjacent nozzle, according to the rotation of the central part,
         the nozzles are ovoid in cross-section, and
         the covering units are formed such that ends of the covering units, which contact an inner surface of the burner, have concave portions, the concave portions having a shape corresponding to the ovoid cross section of the nozzles.

2. The reformer of claim 1, wherein the nozzles are disposed upon the burner such that the flames directed into the space between the outer surface of the burner and the reforming catalyst evenly heat all portions of the inner surface of the reforming catalyst.

3. The reformer of claim 1, wherein the controller is to selectively control a position of the nozzle covering element, according to variations in an amount of the combustion fuel supplied to the burner, such that the flames directed into the space between the outer surface of the burner and the reforming catalyst are adjusted to maintain contact with the reforming catalyst.

4. The reformer of claim 3, wherein the flames each comprise an inner flame portion, and the controller is to maintain each inner flames portion in contact with the reforming catalyst.

5. The reformer of claim 1, wherein:
   the controller is to control the position of the nozzle covering element, such that the nozzle covering element covers an increased portion of each of the nozzles in response to a decrease in the amount of the combustion fuel supplied to the burner, and the nozzle covering element covers a decreased portion of each of the nozzles in response to an increase in the amount of the combustion fuel supplied to the burner.

6. The reformer of claim 1, wherein the concave portion corresponds to a portion of an ovoid curvature the nozzles such that an opening of the nozzle maintains an ovoid shape in cross-section when the nozzle is partially covered by one of the covering units.

7. The reformer of claim 1, further comprising a motor to rotate the nozzle covering element.

8. The reformer of claim 1, further comprising an exhaust path, to direct an exhaust gas from the flames out of the reformer.

9. The reformer of claim 1, further comprising a hydrogen guide, to direct hydrogen from the reformer catalyst out of the reformer.

* * * * *